United States Patent

[11] 3,611,899

[72] Inventors Hisanori Ataka;
 Nobunao Mikami, both of Kawasaki-shi, Japan
[21] Appl. No. 773,155
[22] Filed Nov. 4, 1968
[45] Patented Oct. 12, 1971
[73] Assignee Kabushiki Kaisha Ricoh
 Tokyo, Japan
[32] Priority Nov. 8, 1967
[33] Japan
[31] 42/71757

[54] MULTIPHOTOGRAPHIC DEVICE
 1 Claim, 4 Drawing Figs.
[52] U.S. Cl. .................................................. 95/18 R,
 95/36 R, 352/46, 352/58, 352/81
[51] Int. Cl. .................................................. E01c 11/10
[50] Field of Search.......................................... 95/18, 18
 D, 36; 352/46, 53, 58, 81

[56] References Cited
 UNITED STATES PATENTS
 1,780,191 11/1930 Huebner........................ 95/36

| | | | |
|---|---|---|---|
| 1,875,244 | 8/1932 | Keen.......................... | 95/36 X |
| 2,661,651 | 12/1953 | Stiper......................... | 352/58 |
| 2,943,533 | 7/1960 | Goodbar..................... | 95/18 P UX |
| 3,099,195 | 7/1963 | Goodbar..................... | 95/18 P X |
| 3,291,555 | 12/1966 | Browning.................... | 95/18 P X |

FOREIGN PATENTS

| | | | |
|---|---|---|---|
| 633,689 | 2/1928 | France........................ | 95/18 P |
| 421,120 | 12/1934 | Great Britain................ | 352/81 |
| 412,535 | 1/1946 | Italy............................. | 352/81 |

*Primary Examiner*—Samuel S. Matthews
*Assistant Examiner*—Monroe H. Hayes
*Attorney*—Burgess, Ryan and Hicks ABSTRACT: A multiphotographic device comprising a photographic lens consisting of a group of a multitude of microlenses arrayed integrally in one plane in columns and rows; and an opaque moving plate disposed between the photographic lens and a photosensitive material which is disposed backwardly of the moving plate, and having a plurality of equidistantly spaced apart apertures.

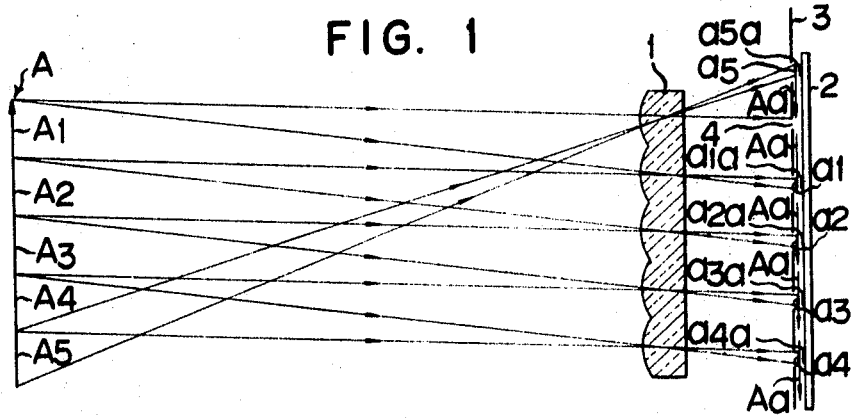
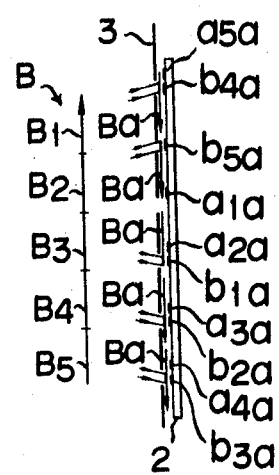
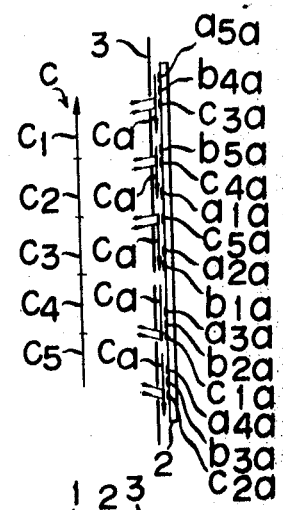
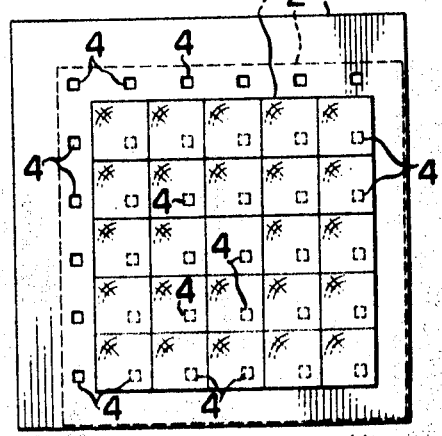
INVENTORS
Hisanori Ataka
Nobunao Mikami
BY Burgess, Ryan + Hicks
ATTORNEYS

MULTIPHOTOGRAPHIC DEVICE

BACKGROUND OF THE INVENTION

The present invention relates to a multiphotographic device and more particularly a multiphotographic device of the type wherein an image of one subject is finely split so as to be recorded upon a photosensitive material as a multitude of finely split and distributed images; an image of another subject is recorded in the same manner as described above except that these finely split distributed images of said image of said another subject may not be overlapped upon said first mentioned finely split distributed images upon said photosensitive material; an image of a still another subject is recorded as finely split distributed images upon the photosensitive material as described above; and so on.

Generally, the conventional multiphotographic device is constituted of a first lens to be directed toward a subject to be photographed, a second lens consisting of a multitude of microlenses and an aperture disposed in the vicinity of or within said first lens. Therefore, the multiphotographic device is large in size in view of the arrangement of said lenses. Furthermore, the multiphotographic device of the type described has a tendency of becoming increasingly larger in size because only one aperture is normally utilized so as to displace this aperture from one position to another so that the range in which the aperture is displaced becomes larger, whereby the mechanism used to displace this aperture becomes complicated in structure and large in size.

SUMMARY OF THE INVENTION

One of the novel features which are believed to be characteristic of the present invention both as to its structure and mode of operation resides in the fact that the multiphotographic device of the present invention comprises a photographic lens consisting of a group of a multitude of microlenses arrayed integrally in one plane in columns and rows, and apertures equidistantly spaced apart from each other and disposed backwardly of said photographic lens so that each of said apertures focuses only one portion of a plurality of images of subjects upon a photosensitive material, whereby images which are finely split by said apertures are successively recorded upon said photosensitive material by displacing said apertures from one position to another whenever photographed.

According to the present invention, said microlens group serves as an objective so that an additional photographic lens is not required, whereby the photographic device of the present invention can be made compact in size and light in weight with less production cost.

According to the present invention, the range of the displacement of one aperture is within a size of one microlens at the most, means for displacing the apertures can be also made compact in size and light in weight.

Other objects and advantages of the present invention will become apparent from the following description of a preferred embodiment thereof, taken in conjunction with the accompanying drawing.

BRIEF DESCRIPTION OF DRAWINGS

FIG. 1 is a side view illustrating only the essential parts of a multiphotographic device according to the present invention;

FIG. 2A and FIG. 2B are explanatory views each illustrating finely split images recorded upon photosensitive material; and FIG. 3 is a front view illustrating a microlens group as well as moving apertures.

DESCRIPTION OF THE PREFERRED EMBODIMENT

The present invention will be described hereinafter in more detail with reference to the accompanying drawing wherein reference numeral 1 designates a photographic lens consisting of a group of microlenses which are arrayed integrally in one plane in columns and rows; 2, a photosensitive material disposed backwardly of the photographic lens; and 3, an opaque moving aperture plate in which are arrayed in columns and rows equidistantly spaced apertures 4, each being in the form of a square.

When the photographic lens 1 is directed toward a subject A to be photographed, images $Aa$ whose number is equal to a number of microlenses constituting the photographic lens 1 are focused upon the photosensitive material 2. However, since the moving aperture plate 3 having a plurality of apertures 4 is disposed forwardly of the photosensitive material 2, only the images passing through the aforementioned apertures are permitted to focus upon the photosensitive material 2. This will be described in more detail with reference to FIG. 1. The uppermost aperture of the moving plate 3 restricts the light beam or ray so that only one portion $A_5$ of the subject A is focused upon the photosensitive material 2 as a miniature finely split image $a_{5a}$ corresponding to the aforementioned portion $A_5$ of the subject A. In the same manner as described above, the third aperture from the top of the moving plate 3 serves only to focus the portion $A_1$ of the subject A upon the photosensitive material 2 as a tiny finely split image $a_{1a}$. In the similar manner as described hereinabove, the remaining apertures serve to focus the images of portions $A_2$, $A_3$, and $A_4$ upon the portions of the photosensitive material corresponding to respective apertures.

As described hereinabove, one subject is distributed over the surface of the photosensitive material 2 as finely split images so that it is impossible to recognize what is recorded upon the photosensitive material. The images can be projected upon a screen as one reproduced image, after the photosensitive material bearing these images has been processed, by illuminating thus processed images for projection in the projection optical system which is identical to the multiphotographic device used for recording these images except that the lights for projection travel along the paths opposite in direction to those when photographed.

After having photographed the first subject A as described above, the moving plate 3 is displaced downwardly from the position shown in FIG. 1 toward the position shown in FIG. 2A in such a manner that each of the apertures is disposed in opposition to a portion of the photosensitive material which has not yet been exposed. Thereafter, the photographic lens 1 is directed toward the second subject B to be photographed, then each portion $B_1$, $B_2$, $B_3$ and so on of this subject B is recorded upon the photosensitive material 2 as finely split image $b_{1a}$, $b_{2a}$, $b_{3a}$ and so on. When the position of the moving aperture plate 3 is further displaced from the position as shown in FIG. 2B and the photographic lens is directed to the third subject C, then each portion of the subject C is recorded upon the photosensitive material 2 as finely split image $c_{1a}$, $c_{2a}$, $c_{3a}$ and so on as in the cases of the subjects A and B.

Overlapping of the finely split images is to be avoided when the moving plate is displaced from one position to another. The number of subjects to be recorded on a single photosensitive material is determined by the numbers of steps in vertical and horizontal directions of the aperture plate 3 to be displaced in such a manner as described above. For example, when the aperture is displaced in seven steps in each of the vertical and horizontal directions, then the total of 49 pictures can be recorded upon a single photosensitive material.

Now referring to FIG. 1 again, the subject A to be recorded is not limited to an object or scene, but may be an image formed by another lens disposed forwardly of the photographic lens 1 between these lenses. The shutter which is used for photographing may be disposed in the vicinity of the aforementioned other lens when this lens is disposed additionally or may be disposed in the vicinity of the photographic lens 1 or immediately before the moving aperture plate 3 when the aforementioned lens is not utilized.

The present invention has been described with a particular reference to one preferred embodiment thereof, but it will be understood that variations and modifications can be effected without departing the spirit of the present invention as described hereinabove and as defined in the appended claim.

1. Multiphotographic devices for recording a complete image of an object in a plurality of split images on photosensitive material comprising:

an integral lens group of microlenses arrayed in rows and columns in a single plane, each said microlens having predetermined vertical and horizontal size dimensions;

the photosensitive material spaced from said lens group on the side opposite to the object;

an aperture plate positioned closely adjacent said photosensitive material between said photosensitive material and said lens group;

said aperture plate having a plurality of apertures formed therein, said apertures being equidistantly spaced from each other and arrayed in columns and rows corresponding to the array of the lenses in said lens group;

each said aperture formed as a square and of a size to focus one of said split images on a portion of said photosensitive material;

said aperture plate positioned to be vertically and horizontally movable with respect to said lens group and said photosensitive material, said aperture plate being sequentially movable in incremental steps, and said apertures thereupon focusing different split images at each said step on portions of said photosensitive material spaced from previously focused split images; and said aperture plate having limited vertical and horizontal movement such that the range of movement of an individual aperture is less than said size dimensions of an individual microlens.